United States Patent [19]

Janecek et al.

[11] Patent Number: 4,622,144
[45] Date of Patent: Nov. 11, 1986

[54] PRESSURE FILTER APPARATUS

[75] Inventors: Louis Janecek, Southfield; Richard H. Wykoff, Livonia, both of Mich.

[73] Assignee: AMSTED Industries Incorporated, Chicago, Ill.

[21] Appl. No.: 622,976

[22] Filed: Jun. 21, 1984

Related U.S. Application Data

[63] Continuation of Ser. No. 367,444, Apr. 12, 1982, abandoned.

[51] Int. Cl.⁴ ............................................. B01D 23/06
[52] U.S. Cl. ..................................... 210/351; 100/211
[58] Field of Search ............... 210/111, 225, 258, 350, 210/351, 358, 405, 456; 100/122, 126, 130, 211

[56] References Cited

U.S. PATENT DOCUMENTS

| | | | |
|---|---|---|---|
| 817,252 | 4/1906 | Kneuper | 210/350 X |
| 3,276,594 | 10/1966 | Gwilliam | 210/350 |
| 4,116,831 | 9/1978 | Keat | 210/771 |

*Primary Examiner*—David Sadowski
*Attorney, Agent, or Firm*—Edward J. Brosius; Charles E. Bouton

[57] ABSTRACT

A filtering apparatus and method wherein the solids in a liquid suspension are introduced into a pressure vessel and filtered through a filter section and pneumatic pressure is introduced after further flow of the liquid suspension is cut-off to cause continued flow through the solids accumulated in the filter section to expose gradually increasing areas of accumulated solids to the pneumatic pressures on the filter section and to compress the solids into a cake.

6 Claims, 8 Drawing Figures

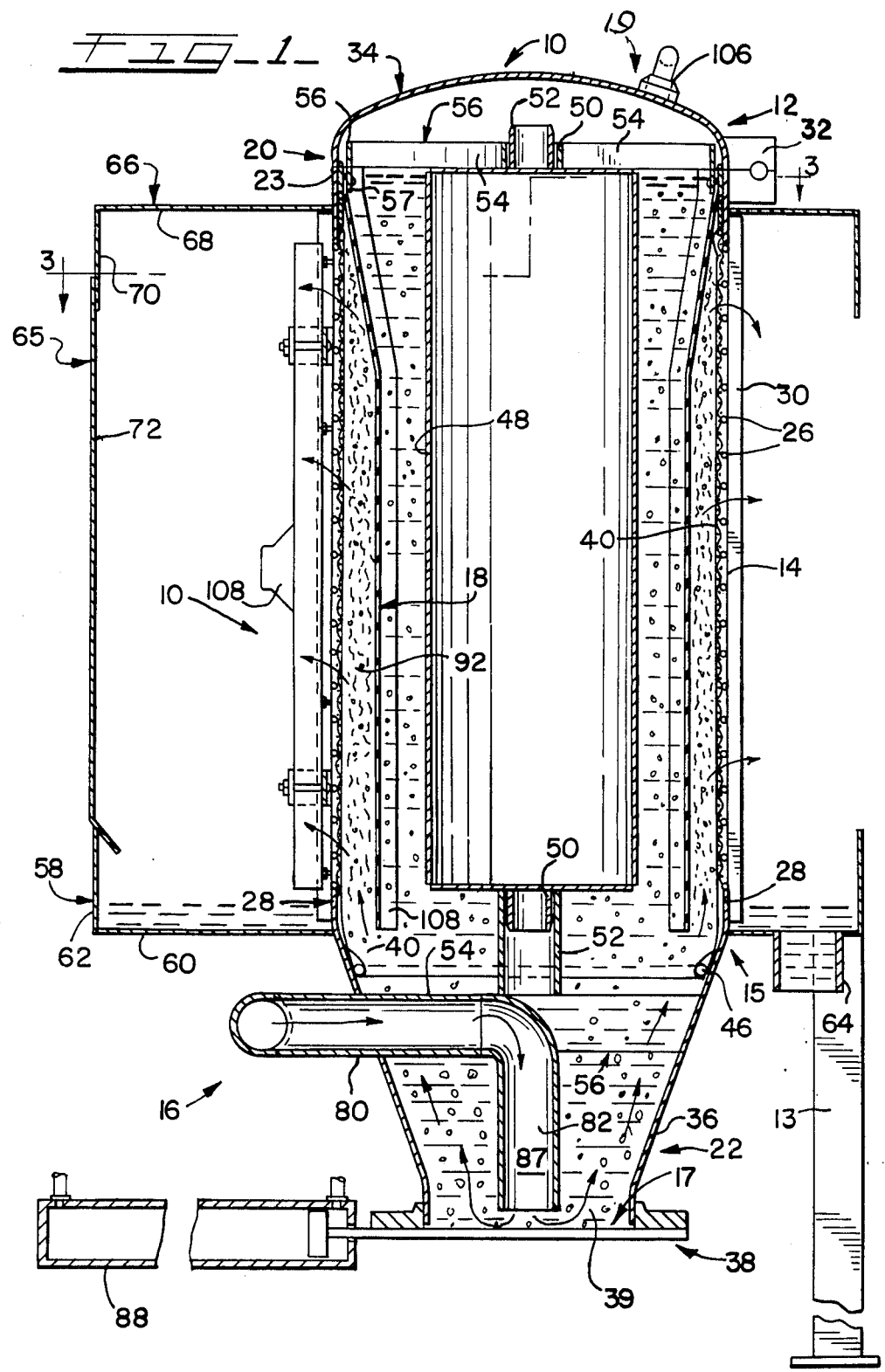

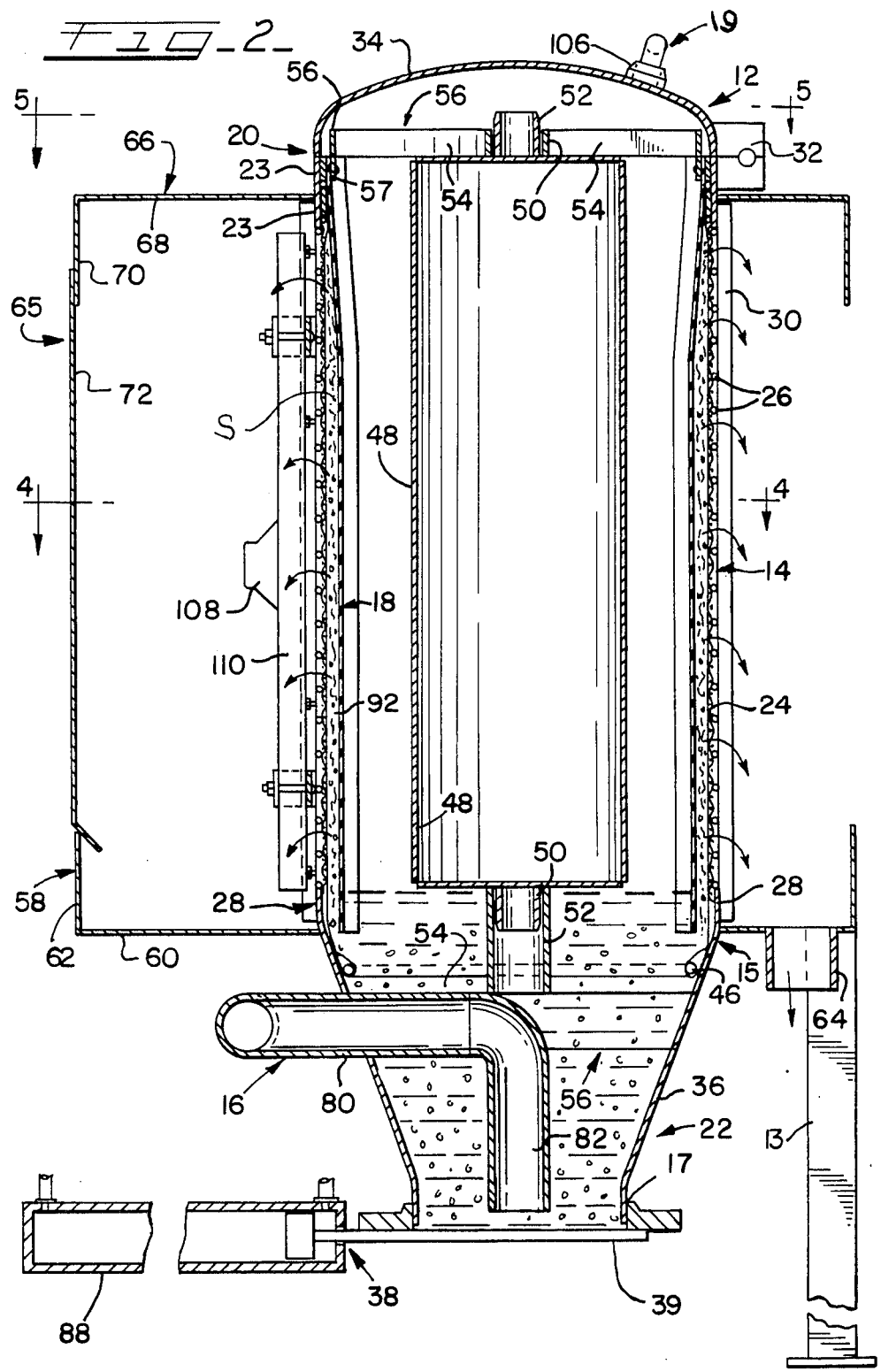

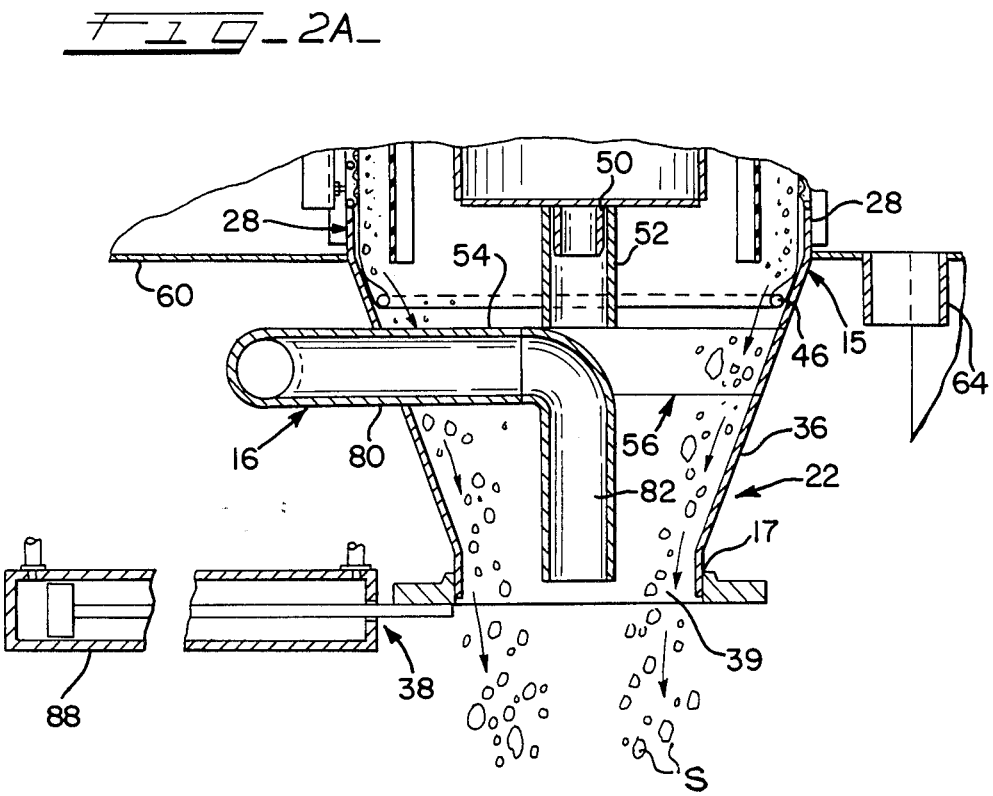

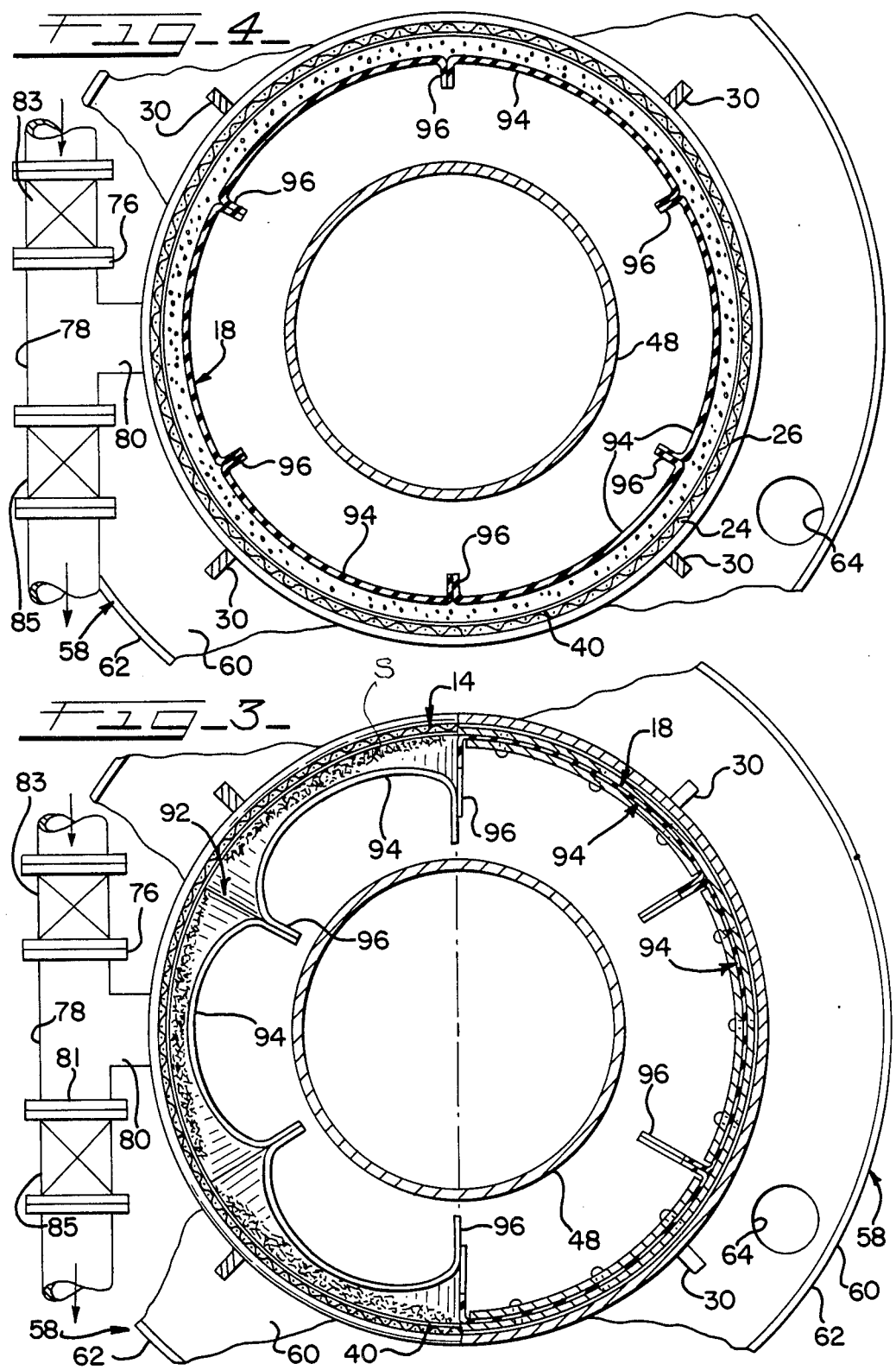

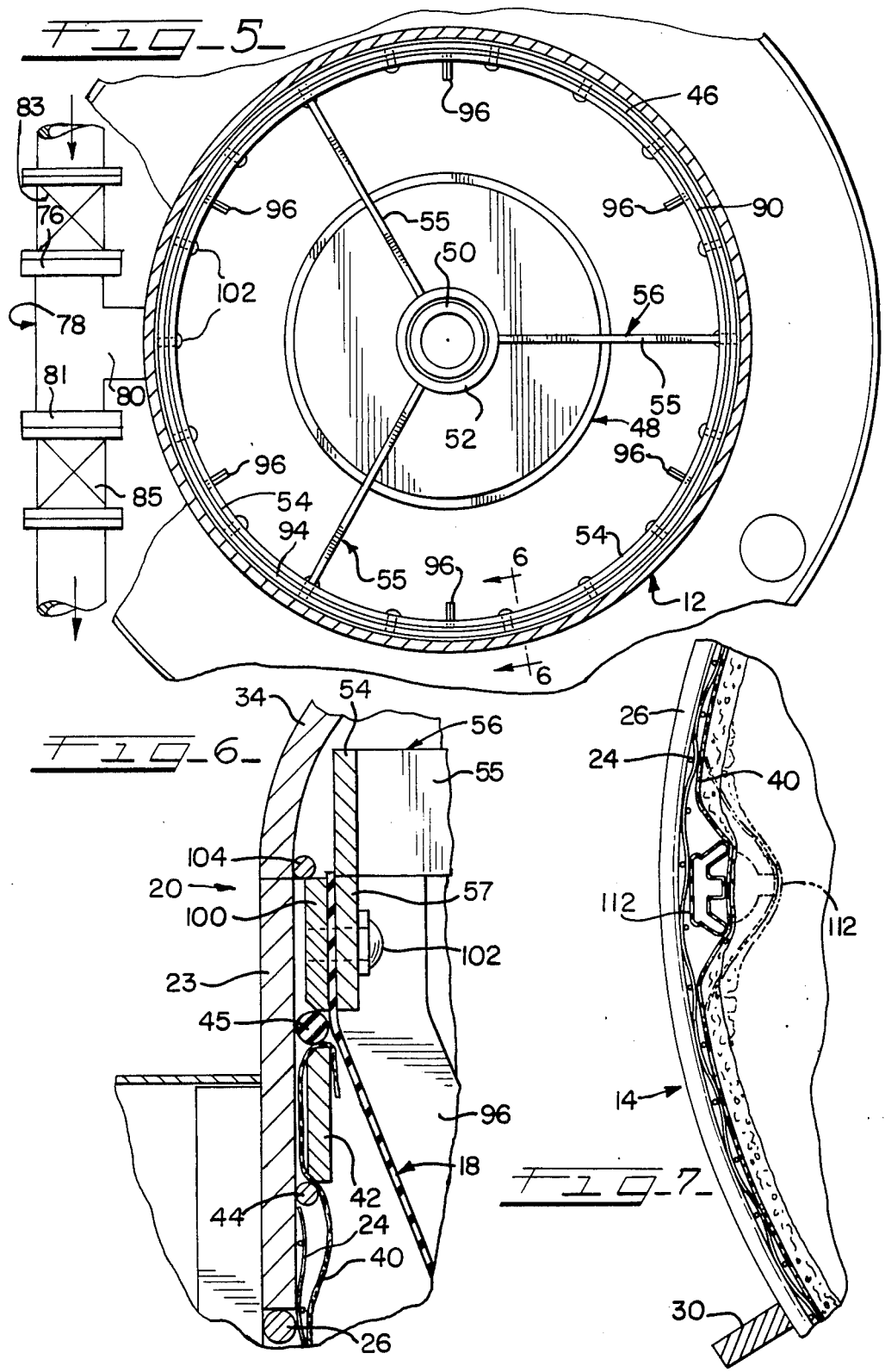

PRESSURE FILTER APPARATUS

The present application is a continuation of prior application Ser. No. 367,444 filed on Apr. 12, 1982, now abandoned.

FIELD OF THE INVENTION

The present invention relates to a filtration method and filter apparatus for separating suspended solids from a liquid suspension and more particularly, to a method and a filter apparatus constructed and arranged to extract liquid from the suspended solid by means of pneumatic pressure applied thereon after separation of the suspended solids from the liquid suspension.

BACKGROUND OF THE INVENTION

Filtration systems having a filter media for separating suspended solids from a liquid suspension such as a slurry may require the removal of the excess liquid from solid which has been separated from the slurry. One such system may be a coolant recovery system as for example of the type used in industrial machining operation wherein the coolant carrying the waste machine particles are processed to separate the coolant from the waste machine particles. The coolant is recovered and recycled into the machining operation. The separated waste particles after separation through a filter media may be in the form of a sludge. These sludges may present handling or disposal problems because of excessive quantities of liquid retained therein. In other liquid suspension filtration systems it may be desirable to recover the solid for further use rather than the liquid as described above. In such systems it may be desirable to remove the maximum quantity of liquid in order to minimize or eliminate drying of the separated suspended matter by the application of heat or the like. The recovery of coal fines of metallurgical coal resulting from coal washings is one such application in which it is desirable that the maximum quantity of the wash liquid be extracted from the fines in order that such fines may be suitable for use in metallurgical processes. In other liquid suspension filtration systems, it may be desirable to recover both the liquid and solid for further use.

In accordance with the present invention, it is proposed to provide a new and novel liquid suspension filtration method and apparatus for removing liquid from the suspended solids separated from liquid and deposited on a filter media or septum through which the liquid suspension carrying the solids has passed.

This is accomplished generally by introducing a liquid suspension into a pressure vessel having a filter wall section on which the solids are deposited. The vessel is filled so that the entire surface area of the filter section is covered. As the liquid flows through the filter wall section the suspended solid is deposited and accumulated thereon with the filtrate passing therethrough. When the solids accumulated on the filter section are of such a thickness that further filtration is no longer feasible, flow of liquid into the vessel is discontinued and pneumatic pressure means are actuated to create a pneumatic pressure within the vessel. This causes further flow of liquid through the accumulated solids on the filter section and gradually displaces the liquid suspension from the filter section to expose increasing areas of accumulated solid to the pneumatic pressure. The pneumatic pressure acting on the exposed solids is operative to compress or squeeze the solids against the filter section and remove additional liquid therefrom to form layer in the nature of a cake. When the excess liquid is displaced from the filter section, the remaining liquid suspension is removed from the vessel and the pneumatic pressure is released. Thereafter the cake is removed from the septum and discharged from the vessel.

The above described arrangement is suitable for the extraction of liquids from suspended solids which are substantially air impervious when separated and deposited on the filter section. However, should the separated suspended solid not have the impervious characteristic, the arrangement of the present invention may be provided with a flexible fluid impervious curtain which overlies the filter section. The curtain is constructed and arranged so as to be spaced from the filter section to permit the passage of liquid through the latter. Upon the application of the pneumatic pressure to gradually displace the liquid from the filter section, the flexible curtain is forced into face to face engagement with the solids accumulated on the filter section by the pneumatic pressure acting thereon to compress the solids and extract liquid therefrom in substantially the same manner as described above.

DESCRIPTION OF THE DRAWINGS

FIG. 1 is an elevational view partially in cross section of a filter apparatus embodying the structure of the present invention and showing the components thereof in an operating and filtering position.

FIG. 2 is an elevational view similar to FIG. 1 but showing the components in a position for extracting liquid from the suspension being filtered.

FIG. 2A is a fragmentary cross sectional view of the filter apparatus showing the closure in its open position with solid cake being discharged through the outlet.

FIG. 3 is a fragmentary cross sectional view taken generally along the lines 3—3 of FIG. 1.

FIG. 4 is a fragmentary cross sectional view taken generally along the lines 4—4 of FIG. 2.

FIG. 5 is a fragmentary cross sectional view taken generally along the line 5—5 of FIG. 2.

FIG. 6 is an enlarged fragmentary cross sectional view taken generally along the lines 6—6 of FIG. 5.

FIG. 7 is a horizontal fragmentary cross section through the upright wall of the filter apparatus and showing in particular an optional auxiliary tube for dislodging suspended matter cake.

DESCRIPTION OF THE INVENTION

Referring to the drawing there is shown a filter apparatus 10 embodying the structure of the present invention. The filter apparatus comprises generally a vessel 12 having a porous filter section 14, a fluid inlet means 16 for introducing a liquid suspension into the vessel, a fluid impervious curtain 18 for compressing suspended solids S accumulated on the surface of the filter section 14, and pneumatic pressure means 19 for applying pressure forces on the liquid and to compress the solids against the filter section 14. The vessel 12 may be supported on suitable framing 13.

In the form shown, the vessel 12 is of generally cylindrical shape including an upstanding wall section 15 constructed to provide an outlet 17 for the suspended matter of the liquid suspension being filtered, a top section 20 and a bottom section 22. The vessel is constructed to withstand the higher than atmospheric pressures to which the vessel 12 is subjected during use as more fully explained hereinafter.

The wall section 15 includes an upper cylindrical end 23 having attached thereto the filter section 14. As shown the filter section 14 includes a wire screen 24 which may be of a larger mesh than that required to perform the filtering function. The wire screen is attached to the end 23. A spiral wound rod 26 is fixed to the cylindrical upper end 23 and to lower cylindrical section 28. Fixed to the spiral rod 26 are a plurality of angularly spaced upright reinforcing bars 30 fixed also to the upper and lower cylindrical sections 23 and 28.

Hingedly attached to the upper cylindrical end 23 by means of hinge 32 is a dome cover 34. The mating edges of the cover 34 and cylindrical end 23 may be sealed by a suitable sealing gasket (not shown).

The bottom or outlet section 22 may be in the shape of an inverted truncated cone 36 welded to the lower cylindrical section 28. A closure assembly such as a slide valve 38 is fixed to the cone 36 to selectively open and close the outlet or opening 17 through which the substantially liquid free solid or cake is discharged as more fully to be described hereinafter. The valve assembly 38 may be of conventional two-way solenoid or pneumatic two-way construction so that valve 38 is movable between an open (FIG. 2A) and closed (FIG. 2) position over the opening 17.

In the embodiment shown the filter section 14 includes a filter media sleeve 40 disposed along the interior of the vessel 12 to overlie the wire screen 24. It is to be understood however that in some applications of the filter apparatus 10, such media may not be used, but rather the mesh of the screen or the wall structure may be so modified that a separate filter media is not required. As shown, the filter media 40 is in the form of a tubular sleeve made from a porous material either woven or nonwoven. Such filter materials are well known in the art.

As shown in FIG. 6, the filter media sleeve 40 is removably attached to the vessel 12 at its upper end. The upper free end of the sleeve 40 is draped over a hoop 42 which is releasably gripped between a rod 44 of circular cross section and a vertically spaced resilient O-ring 45. When the hoop 42 is seated between the rods 44 and O-ring 45, the sleeve 40 is securely clamped along the opposite edges of the hoop 42.

The lower end of the filter media sleeve 40, FIGS. 1 and 2, is provided with a seam which receives a hoop 46 of circular cross section. The hoop 46 serves to hold the filter media 40 in sealing engagement with the surface of the base 36 as shown.

The capacity of the vessel 12 may be decreased by a hollow sealed drum 48 to reduce the volume of pressurized air which is subsequently charged into the vessel as more fully to be explained hereafter. The drum 48 is coaxilly disposed within the vessel by means of cylindrical shafts 50 fixed to the upper and lower ends thereof. The cylindrical shafts 50 seat within complementary open ended cylindrical supports or bosses 52.

The cylindrical bosses 52 are fixed to a circular strap 54 by means of radial legs 55 to form spiders 56. The upper one of the spiders 56 is seated on a hoop 57 and the lower spider 56 is removably seated in the truncated cone section 36. In this manner both the drum 48 and its associated spider support 56 may be removed from the vessel.

A trough 58 for collecting the filtrate is disposed about the exterior of the lower section of the vessel 12. The trough 58 is defined by an annular base 60 and an upstanding flange 62. A filtrate outlet 64 is provided the annual base 60.

A filtrate or trough cover structure 65 is disposed about the filter section 14 and includes an annular hood 66 defined by an annular top panel 68 and a downwardly depending flange 70. Disposed between the depending flange 70 and the upstanding flange 62 is a removable side wall panel 72 which permits access to the filter section 14.

The fluid inlet arrangement as shown in FIGS. 1, 2 and 5 includes a pump (not shown) and piping from a liquid suspension tank (not shown). The pump is connected to a branch 76 of a T-connection 78. The T-connection 78 has a common stem 80 to which is attached piping 82 extending into the base or truncated section 22 of the vessel 12. A branch 81 is connected to a discharge pipe for returning liquid suspension to the tank. A valve 83 is connected in the branch 76 for controlling flow from the tank into the vessel 14 and a valve 85 is connected to the branch 81 for directing flow of the liquid suspension from the vessel 12 to the tank.

The pipe opening 87 is directed downwardly toward the slide of a closure member such as a valve 38 which is movable between a normal closed position across the base opening 17 as shown in FIG. 1 and an open position as shown in FIG. 2. The slide valve 38 is actuated by a fluid actuated cylinder 88 connected to a suitable source of pressurized fluid.

In accordance with the present invention the curtain 18 is loosely suspended from its upper end within the vessel 14 and has its lower end spaced from the side wall so as to provide an annular chamber 92 contiguous with the filter section into which the liquid suspension flows. The curtain is made from a flexible fluid impervious material such as rubber or a plastic material.

The curtain 18 may be a unitary structure formed as by molding or may be fabricated from a plurality of sheets.

As shown in FIG. 5 the curtain 18 is in the form of a tubular sleeve comprising a pluralty of panels or sections 94 which are bonded together along adjacent edges as by adhesive vulcanizing, or heat sealing or the like to form inwardly extending radial seams 96. The sum of the widths of the panels 94 is such as to snuggly conform with the inner circumference of the vessel 12 at the filter section 14. Upon filling the vessel 12, the seams 96, which tend to impart lengthwise rigidity to the curtain, cause the panels 94 to be irregularly spaced inwardly away from the surface of the filter section 14 as shown in FIG. 3. In this manner the major portion of the liquid suspension in the vessel is directed into a chamber 92 defined between the filter section 14 and curtain 18 for passage through the filter section 14. When the vessel 12 is empty and under normal atmospheric conditions the curtain panels 94 are loosely disposed within the vessel 14 in an irregular manner as shown in FIG. 1.

As shown in particular FIG. 6, the upper end of curtain 18 is clamped between a pair of hoops 57 and 100 and is fastened thereto by screws 102. The inner one of the hoops 100 is removably seated between a circular rod 104 fixed to the vessel 12 as by welding and the O-ring 45 spaced therefrom to resiliently grip the hoop 100 about its edges. It is to be noted that the rods 44 and 104 and the O-ring 45 are located relative to each other to provide two adjacent seats for the hoop 42 and hoop 100, respectively, so that the O-ring 45 is common to grip both of the hoops 42 and 100 seated therein. Should the unit 10 be used in an application wherein a curtain is not required, a single hoop (not shown) may be substituted between the rod 104 and the O-ring 45 to complete the assembly. The hoops 104 and 57 also serve to support the spider hoop 54 of the upper spider assembly 56.

The pneumatic pressure means 19 located on the upper section 20 includes comprssed air nozzle 106 mounted on the cover 34. The nozzle 106 is connected by piping to a suitable source of compressed air (not shown). The compressed air source may be of the type conventionally used in manufacturing facilities and which is capable of delivering the desired pressure and volume. Typically such conventional types of air compresser delivers about 100 psi.

Blow-off means 108 connected to a suitable source of pressurized air are mounted on radially spaced supports 110 fixed to the upper and lower sections of the vessel 12. The blow-off means 108 are operative to assist in the removal of the accumulated solids cake on the filter section. As shown in FIG. 7 additional inflatable tube means 112 extending along the length of the screen 24 and the filter media 40 may also be used to separate solids from this media. As shown upon inflation by a suitable source of fluid under pressure the tubes are inflated to the phantom line position to cause that solid layer to be separated.

In operation, the liquid suspension is introduced into the vessel 12 by actuation of the pump (not shown) so as to cause flow of the liquid from the liquid suspension containing tank through the open valve 83 into the branch 76 and piping 82 downwardly toward the closed slide valve 38. The valve 85 in the other branch 81 is closed so that there is no return flow of the liquid suspension to the tank.

Assuming the liquid suspension is of the type containing a solid which accumulates on the filter screen in a manner which is substantially impervious to air flow when of a significant thickness, such as a kaolin, the curtain 18 is removed prior to introducing the liquid suspension. The curtain 18 may be removed by opening the cover 34 and removing the hoop 100 from its gripping engagement between the rod 104 and O-ring 45. A separate hoop may be replaced for the curtain hoop 104. It is to be noted that the upper spider 56 is also lifted from its resting position on the hoop 57. After the curtain is removed the spider 54 may be seated on the replacement hoop or hoops.

Liquid suspension is continuously introduced into the vessel whereupon the suspension is filtered through the filter section 14 and the solids are accumulated thereon. The filtrate drops into the trough 60 from which it flows through the outlet 64 for disposal or recovery. The solid, such as kaolin, is accumulated on the filter section 14 and as the thickness of kaolin accumulates, the resistance to flow therethrough increases so that the suspension fills the vessel and the pressure increases. When the pressure, as detected by a pressure sensitive dectector (not shown) is at a predetermined set point. Further flow into the vessel is cut off by closure of the tank inlet valve 83.

The compressed air nozzles 106 are then opened to maintain the vessel charged with a pneumatic or air pressure higher than the above set point. This causes the liquid to continue to flow through the accumulated layer of solids on the filter section 14. As a result the liquid level within the vessel drops so that the pressure compresses the solids that are exposed above the upper liquid level against the filter media 40 to further extract liquid therefrom. At the same time, the pneumatic pressure blowing therethrough the exposed solids serves also to create a drying effect on the accumulated solids. In this manner the accumulated solids are formed into a substantially liquid-free cake on the filter surface.

When the liquid level drops below the filter section 14 the valve 85 is opened to withdraw the remaining liquid suspension from the vessel through an inlet 82 and branch 81 for return to the liquid suspension carrying tank. The slide valve 38 is then opened. The cake solids may be removed by cake breaker means such as pneumatic jets 108 radially spaced about the vessel, as shown, and/or expandable tubes 112 are inflated to break the solids as shown in FIG. 7. The separated cake drops through the opening 39 into a hopper. To resume operation after the cake is removed, the slide valve 38 and the valve 85 are closed and the intake valve 83 opened so that the pump again feeds liquid suspension into the vessel for further filtration.

In the event that the suspended solid is not capable of providing substantial resistance to the flow of fluid through the filter section 14, the curtain 18 is installed prior to introducing the suspension. The liquid suspension is pumped into the vessel over the filter section 14 so that it may be filtered through the latter as shown in FIG. 4. The suspended solid accumulates on the filter media 40 of the filter section 14 and the filtrate is collected in the trough 60 in the same manner as previously described. When the filtration pressure is at the set point or after a timed interval, the valve 83 from the pump is closed to shut off flow from the tank. The pneumatic means 106 are actuated to cause continued flow through the filter section and as the liquid level progressively drops, as heretofore described, the pneumatic forces are operative to cause pressure to be exerted on the exposed surface of the curtain above the liquid so that further liquid is squeezed from the accumulated layer of solids until the liquid level drops below the lower edge of the curtain.

At this time the compressed air flows upwardly into the space 92 occupied by the accumulated layer so that the air pressure within the chamber is released and the nozzles 106 may be closed. The outlet valve discharge 85 is opened and the remaining liquid suspension in the vessel removed through the pipe 82 and branch 81 to return the suspension back to the tank.

After the liquid suspension is removed, the slide valve 38 is opened for discharge of the cake. Upon inactivation of the pneumatic nozzle 106, the curtain panels 94 tend to flex irregularly away from the filter section causing the cakes to separate and be discharged through the opening 39 as shown in FIG. 2A. If such flexing of the curtain fails to occur the remaining cake on the filter section may be removed by the shaker means such as the pneumatic jets or expandable tubes, as heretofore described.

What is claimed is:

1. A filter device for separating suspended solids from a liquid suspension, said filter device comprising a pressure vessel having a top and a bottom, an upstanding porous filter section for separating suspended solids from a liquid suspension in said vessel, a fluid impervious and flexible curtain suspended in said vessel in contact on both of its sides with said liquid suspension in normally spaced relationship from said filter section to permit fluid flow therethrough, inlet means communicating with said vessel for introducing said liquid suspension into said vessel to thereby separate said suspended solids from said liquid suspension, pneumatic pressure inlet means connected to one end of said vessel for introducing pneumatic pressure directly into said pressure vessel at a pressure in excess of atmospheric pressure above said liquid suspension and into direct contact therewith on one side of said impervious flexible curtain when liquid flow into said vessel is shut off, said pneumatic pressure inlet means being operative to cause continued flow through solids accumulated on said filter section so as to gradually lower liquid level in said vessel until said liquid level is below said filter section and causing said flexible curtain to conform to said filter section and compress the accumulated solids which are disposed above the liquid suspension as said liquid level drops to extract additional liquid from said solids.

2. The filter device as defined in claim 1 wherein said vessel includes a bottom opening below said filter section and wherein valve means are provided for opening and closing said bottom opening.

3. The filter device as defined in claim 2 wherein means are provided on said vessel for assisting in separation of the compressed solids from said filter section.

4. The filter device as defined in claim 3 wherein means are provided for removing liquid suspension from said vessel when said liquid level is below said filter section whereby said bottom opening may be opened and said solids separated from said filter section discharged therethrough.

5. The filter device as defined in claim 4 wherein both said bottom opening and said means for removing said liquid suspension are coaxially disposed with respect to a central axis of said vessel thereby to facilitate removal of said liquid suspension and said separated solids.

6. The filter device as defined in claim 5 wherein the interior of said vessel is provided with a coaxial filler to reduce the liquid capacity of said vessel.

* * * * *